US008578347B1

(12) United States Patent
Carrick et al.

(10) Patent No.: US 8,578,347 B1
(45) Date of Patent: Nov. 5, 2013

(54) DETERMINING STACK USAGE OF GENERATED CODE FROM A MODEL

(75) Inventors: James Carrick, Natick, MA (US); Peter Szpak, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 1515 days.

(21) Appl. No.: 11/646,848

(22) Filed: Dec. 28, 2006

(51) Int. Cl.
*G06F 9/44* (2006.01)

(52) U.S. Cl.
USPC .......................... 717/133; 717/104; 717/132

(58) Field of Classification Search
None
See application file for complete search history.

(56) References Cited

U.S. PATENT DOCUMENTS

| | | | | |
|---|---|---|---|---|
| 5,136,696 A * | 8/1992 | Beckwith et al. | | 712/240 |
| 5,452,453 A * | 9/1995 | Ando et al. | | 717/104 |
| 5,485,616 A * | 1/1996 | Burke et al. | | 717/133 |
| 5,659,723 A * | 8/1997 | Dimitrios et al. | | 1/1 |
| 5,790,778 A * | 8/1998 | Bush et al. | | 714/38 |
| 5,794,047 A * | 8/1998 | Meier | | 717/133 |
| 5,802,371 A * | 9/1998 | Meier | | 717/133 |
| 5,815,415 A * | 9/1998 | Bentley et al. | | 703/4 |
| 5,822,577 A * | 10/1998 | Ekanadham et al. | | 712/240 |
| 6,053,948 A * | 4/2000 | Vaidyanathan et al. | | 703/14 |
| 6,158,024 A * | 12/2000 | Mandal | | 714/37 |
| 6,247,121 B1 * | 6/2001 | Akkary et al. | | 712/239 |
| 6,253,215 B1 * | 6/2001 | Agesen et al. | | 1/1 |
| 6,286,130 B1 * | 9/2001 | Poulsen et al. | | 717/119 |
| 6,370,632 B1 * | 4/2002 | Kikuta et al. | | 711/205 |
| 6,442,585 B1 * | 8/2002 | Dean et al. | | 718/108 |
| 6,516,305 B1 * | 2/2003 | Fraser | | 706/8 |
| 6,658,653 B1 * | 12/2003 | Bates et al. | | 717/131 |
| 6,772,410 B1 * | 8/2004 | Komatsu et al. | | 717/124 |
| 6,904,590 B2 * | 6/2005 | Ball et al. | | 717/132 |
| 6,938,254 B1 * | 8/2005 | Mathur et al. | | 718/104 |
| 6,968,557 B1 * | 11/2005 | Zhang et al. | | 719/319 |
| 7,152,028 B2 * | 12/2006 | Jahnke | | 703/22 |
| 7,181,733 B2 * | 2/2007 | Sarcar | | 717/140 |
| 7,225,443 B2 * | 5/2007 | Lake | | 718/100 |
| 7,356,666 B2 * | 4/2008 | Kanai et al. | | 711/202 |
| 7,512,738 B2 * | 3/2009 | Balakrishnan et al. | | 717/133 |
| 7,614,035 B2 * | 11/2009 | DeLine | | 717/104 |
| 7,640,538 B2 * | 12/2009 | Bennett et al. | | 717/132 |
| 7,660,884 B2 * | 2/2010 | Pu | | 709/223 |
| 2001/0039487 A1 * | 11/2001 | Hammersley et al. | | 703/2 |
| 2002/0032719 A1 * | 3/2002 | Thomas et al. | | 709/107 |
| 2002/0166112 A1 * | 11/2002 | Martin et al. | | 717/124 |
| 2003/0121010 A1 * | 6/2003 | Aubury | | 716/4 |
| 2003/0167454 A1 * | 9/2003 | Iordanov et al. | | 717/104 |
| 2004/0117540 A1 * | 6/2004 | Hahn et al. | | 711/100 |
| 2004/0143824 A1 * | 7/2004 | Sarcar | | 717/145 |

(Continued)

OTHER PUBLICATIONS

"Chapter 5—RAM Footprint" Sun Microsystmes 2001 <http://java.sun.com/docs/books/performance/1st_edition/html/JPTOC.fm.html> all pages.*
John Regehr , "Say no to stack overflow", UBM Tech , Sep. 2004 , <http://www.embedded.com/Home/PrintView?contentItemId=4025013> , pp. 1-8.*

(Continued)

*Primary Examiner* — Thuy Dao
*Assistant Examiner* — Samuel Hayim
(74) *Attorney, Agent, or Firm* — Nelson Mullins Riley & Scarborough (57) ABSTRACT

In one embodiment, a method of determining stack usage of at least a portion of a model for deployment on a target system is provided. The method may include obtaining information describing a first target system, and using the information to estimate a stack usage related to executing a representation of a component of the model on the first target system.

32 Claims, 8 Drawing Sheets

(56) References Cited

U.S. PATENT DOCUMENTS

| | | | |
|---|---|---|---|
| 2004/0168107 A1* | 8/2004 | Sharp et al. | 714/33 |
| 2005/0049736 A1* | 3/2005 | Miyamoto | 700/108 |
| 2006/0005119 A1* | 1/2006 | Karun et al. | 715/513 |
| 2006/0058976 A1* | 3/2006 | Ferris | 702/123 |
| 2006/0101413 A1* | 5/2006 | Kinno et al. | 717/127 |
| 2006/0107025 A1* | 5/2006 | Cypher | 711/216 |
| 2006/0190711 A1* | 8/2006 | Smith et al. | 712/242 |
| 2006/0225044 A1* | 10/2006 | Lewis | 717/127 |
| 2007/0136403 A1* | 6/2007 | Kasuya | 707/206 |
| 2007/0169039 A1* | 7/2007 | Lin | 717/146 |
| 2007/0220230 A1* | 9/2007 | Kanai et al. | 711/202 |
| 2008/0114870 A1* | 5/2008 | Pu | 709/224 |

OTHER PUBLICATIONS

"MIPS Calling Convention", University of Washington Computer Science Department, 2006, <http://www.cs.washington.edu/education/courses/cse410/09sp/examples/MIPSCallingConventionsSummary.pdf>, pp. 1-13.*

Kaj Hanninen et al., "Determining Maximum Stack Usage in Preemptive Shared Stack Systems", IEEE, 2006, <http://ieeexplore.ieee.org/stamp/stamp.jsp?tp=&arnumber=4032371>, pp. 1-9.*

Sumesh Udayakumaran et al. "Dynamic Allocation for Scratch-Pad Memory Using Compile-Time Decisions", ACM, 2006, <http://delivery.acm.org/10.1145/1160000/1151085/p472-udayakumaran.pdf>, pp. 1-40.*

* cited by examiner

| Stack Usage Dashboard, 550 | | | |
|---|---|---|---|
|  | Maximum | Desired | Estimated |
| + model1.mdl<br>(Target 1) | 100k | 76k | 86k |
| - model2.mdl<br>  - component1<br>  + subsystem1<br>(Target 2) | 125k<br>25k<br>100k | 68k<br>15k<br>50k | 73k<br>20k<br>53k |

DETERMINING STACK USAGE OF GENERATED CODE FROM A MODEL

BACKGROUND

Graphical models may be used to simulate devices and/or systems. In certain applications, it may be desirable to generate code for a target system based on a model. For example, a graphical model, such as a block diagram model, may be used to model a control system for a consumer appliance. When the model is determined to be satisfactory, an engineer may wish to generate code for a target controller installed in the appliance. Some models may allow the engineer to automatically generate code for the target controller using the modeling application.

In certain applications, the engineer may wish to account for capabilities of the target controller, such as account for an amount of memory in the target controller. Conventional modeling applications may not provide the engineer with a capability for determining whether generated code will use memory in the target controller in a desired manner. As a result, the engineer may have to generate multiple model configurations in order to identify one that uses memory in the target controller in a desired manner, such as by not overrunning available memory in the target controller.

SUMMARY

In one embodiment, a method of determining stack usage of at least a portion of a model for deployment on a target system is provided. The method may include obtaining information describing a first target system, and using the information to estimate a stack usage related to executing a representation of a component of the model on the first target system.

In another embodiment, a system for determining stack usage of at least a portion of a model for deployment on a target system is provided. The system includes a plurality of components in the model operating in a modeling or programming environment, the modeling or programming environment obtaining information describing a first target system, and a stack usage calculator to provide an estimate of a stack usage for executing a representation of one or more of the plurality of components on the first target system.

In still another embodiment, a medium storing executable instructions for causing a computing device to determine stack usage of at least a portion of a graphical model for deployment on a target system is provided. The medium including instructions for obtaining information describing a first target system, and for using the information to estimate a stack usage related to executing a representation of a component of the model on the first target system.

In yet another embodiment, a method of displaying data related to a target system in a graphical model is provided. The method includes obtaining data associated with executing a representation of a graphical modeling component of the graphical model on the target system, and displaying the data.

In still another embodiment, a medium storing executable instructions for causing a computing device to display data related to a target system in a graphical model is provided. The medium including instructions for obtaining data associated with executing a representation of a graphical modeling component of the graphical model on the target system, and for displaying the data.

BRIEF DESCRIPTION OF THE DRAWINGS

The foregoing and other aspects, features, and advantages of the invention will become more apparent and may be better understood by referring to the following description taken in conjunction with the accompanying drawings, in which.

DETAILED DESCRIPTION

Exemplary embodiments may provide techniques and/or devices for providing an estimate of a stack usage for executing a representation of a model or a component in a target device and/or system. For example, a representation of a model may be obtained by generating code executable on the target system.

In one implementation, the target system may have one or more stacks operating therewith. The one or more stacks may have a usage level associated therewith, such as a maximum stack usage level. It may be desirable to ensure that the target system has enough stack space for the generated code from the model before the generated code is sent to and/or executed on the target system. Information describing the target system may be used to provide an estimate of the maximum stack usage for executing a representation of a model on the target system.

Maximum stack usage can be determined for a component in the model. In one implementation, a graphical annotation may represent a maximum stack usage for the component. The component can be provided to a user via a user interface (e.g., a graphical user interface) using the model. Characteristics of a target system may be related to how a stack is used on the target system. These characteristics may be helpful to a user or device when estimating stack usage for the target system. For example, every time a function is called, the stack may be used to store and pass function arguments. The stack may also be used to store local variables that are used with the function. The stack may further be used to store a return address for a function.

Code generation techniques in the model may affect stack usage on the target system. For example, a model configuration may be used to specify if the generated code should be used for a single-tasking mode or a multitasking mode. In the single-tasking mode, only one task is used to execute the generated code whereas in the multitasking mode, two or more tasks are used to execute the generated code.

The analysis of stack usage can be displayed for multiple target systems for comparing and studying tradeoffs therebetween. For example, given a model, an analysis of stack usage may be performed for a first target system and a second target system. The analysis of stack usage for the first target system may be displayed side by side with the analysis of stack usage for the second target system. As such, a user may compare the difference in stack usage and study the tradeoffs between the first and second target systems.

Exemplary, embodiments are described for illustrative purposes relative to a Simulink®-compatible modeling environment that enables a graphical model to be built and/or executed. A SIMULINK-compatible modeling environment provides means (e.g., via hardware or software based logic) to use a SIMULINK model and/or features in the SIMULINK-compatible modeling environment. For example, a SIMULINK-compatible modeling environment may provide means to interface with a SIMULINK model, means for importing or exporting a SIMULINK model, means for translating a SIMULINK model, means for integrating a SIMULINK model, etc. Although exemplary embodiments may be described relative to a SIMULINK-compatible modeling environment, the present invention is not limited to these embodiments and may be applied to graphical modeling and/or computing tasks via other graphical modeling environments.

Further examples of graphical modeling environments that may be used to develop and/or execute a graphical model in accordance with exemplary embodiments include, but are not limited to, LabVIEW® or MATRIXx from National Instruments, Inc., SoftWIRE by Measurement Computing, VisSim by Visual Solutions, WiT by DALSA Coreco, VEE Pro by Agilent, Dymola from Dynasim AB, Extend from Imagine That, Inc., Scicos from The French National Institution for Research in Computer Science and Control (INRIA), MSC.Adams® from MSC.Software Corporation, Rhapsody® from iLogix, Inc., Rational® from International Business Machines Corporation, ARTiSAN Studio from ARTiSAN Software Tools, Inc., SCADE™ from Esterel Technologies, Inc., among others. Exemplary embodiments can also be used in a text based environment, such as Mathematica® from Wolfram Research, Inc., Maple™ from Maplesoft, Scilab™ from The French National Institution for Research in Computer Science and Control (INRIA), MATLAB from The MathWorks, Inc., among others.

Figure 1:
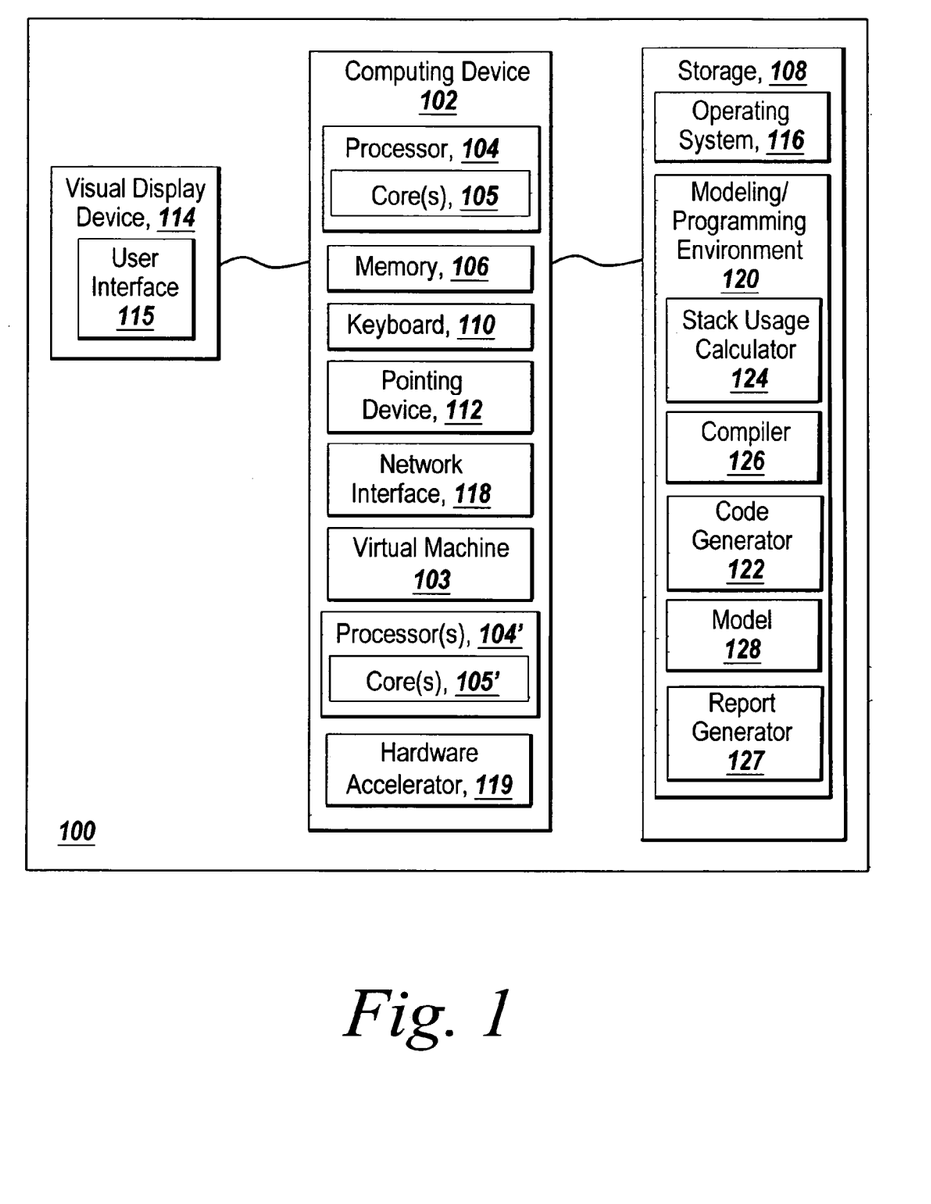
FIG. 1 is a block diagram of a computing device suitable for practicing one or more exemplary embodiments of the present invention.

FIG. 1 depicts an environment 100 suitable for practicing an exemplary embodiment of the present invention. Computing device 102 includes memory 106, on which software according to one embodiment of the present invention may be stored, processor 104, and optionally, one or more processor(s) 104' for executing software stored in the memory 106, and other programs for controlling system hardware. Processor 104 and processor(s) 104' can each be a single core or multiple core (105 and 105') processor.

The memory 106 may include among other things a computer system memory or random access memory (RAM), such as dynamic random access memory (DRAM), static random access memory (SRAM), Magnetoresistive Random Access Memory (MRAM), extended data out random access memory (EDO RAM), etc. A user may interact with the computing device 102 through a keyboard 110, a pointing device 112, and/or a visual display device 114 such as a computer monitor, which may include a user interface 115. Other input devices, such as accelerometer and gyroscope based input devices, active whiteboards, neuro interface devices, may also be used with computing device 102. The computing device 102 may further include a storage device 108, such as a hard-drive, compact disc-read-only memory (CD-ROM), or other computer readable medium, for storing an operating system 116 and other related software, and for storing modeling/programming environment 120, such as a SIMULINK modeling environment, a MATLAB programming environment, etc.

Modeling/programming environment 120 may be used to create, edit, and/or execute a model 128. In one embodiment, model 128 may be stored in storage 108, but as a part of the modeling/programming environment 120. Alternatively, model 128 may be stored in storage 108 but separate from the modeling/programming environment 120. In one embodiment, model 128 may be a graphical model implemented in a graphical modeling environment. In another embodiment, model 128 may be a text based model implemented in a text base programming or modeling environment. In one embodiment, model 128 may, be a combination of a text based model and a graphical model.

Modeling/programming environment 120 may include a compiler 126 that compiles the model 128. Modeling/programming environment 120 may also include a code generator 122 that can be used to generate code from a model 128 for executing on a target system. Modeling/programming environment 120 may further include a stack usage calculator 124 that calculates stack usage of a component and/or a model 128. In one embodiment, a component may be a portion of a code in a text-based model. In another embodiment, a component may be a block, a subsystem, or other elements in a graphical model. Modeling/programming environment 120 may further include a report generator 127 that generates a report on stack usage information related to a component and/or model 128.

One of ordinary skill in the art will appreciate that stack usage calculator 124 can be adapted to be included as part of modeling/programming environment 120, code generator 122, compiler 126, or report generator 127. In addition, code generator 122, compiler 126, report generator 127 or stack usage calculator 124 can be a stand-alone application, module, script, or program, etc., that responds to calls from modeling/programming environment 120.

Additionally, the computing device 102 may include a network interface 118 to interface to a Local Area Network (LAN), Wide Area Network (WAN) or the Internet through a variety of connection types including, but not limited to, standard telephone lines, LAN or WAN links (e.g., IEEE 802.11, IEEE 802.16, T1, T3, 56 kb, X.25), broadband connections (e.g., Integrated Services Digital Network (ISDN), Frame Relay, asynchronous transfer mode (ATM)), wireless connections (e.g., Bluetooth), etc., or some combination of any or all of the above.

The network interface 118 may include a built-in network adapter, network interface card (NIC), Personal Computer Memory Card International Association (PCMCIA) network card, card bus network adapter, wireless network adapter, Universal Serial Bus (USB) network adapter, modem or any other device suitable for interfacing the computing device 102 to any type of network capable of communication and performing operations described herein. Moreover, the computing device 102 may be any computer device and/or system, such as a workstation, desktop computer, server, laptop, handheld computer or other form of computing or telecommunications device that is capable of communication with another device/system and that has sufficient processor power and/or memory to perform the operations described herein.

The computing device 102 can be running substantially any operating system such as a version of the Microsoft® Windows® operating systems, Unix operating system, Linux operating systems, MacOS® operating system, etc. Implementations of computing device 102 may further operate an embedded operating system, a real-time operating system, an open source operating system, a proprietary operating system, an operating system for mobile computing devices, and/or another type of operating system capable of running on computing device 102 and/or performing the operations described herein.

Virtualization can be employed in computing device 102 so that infrastructure and/or resources in the computing device 102 can be shared dynamically. Virtualized processors may also be used with modeling/programming environment 120 and/or other software in storage 108. A virtual machine 103 can be provided to handle a process running on multiple processors so that the process appears to be using only one computing resource rather than multiple computing resources. Multiple virtual machines can also be used with one processor. Other computing resources, such as Field Programming Gate Array (FPGA), Application Specific Integrated Circuit (ASIC), Application Specific Instruction-set Processor (ASIP), Digital Signal Processor (DSP), Graphical Processing Unit (GPU), and General Purpose Processor (GPP), may also be used for executing code and/or software. A hardware accelerator 119, such as implemented in an ASIC, FPGA, or the like, can additionally be used to increase a processing rate of the computing device 102.

Figure 2:
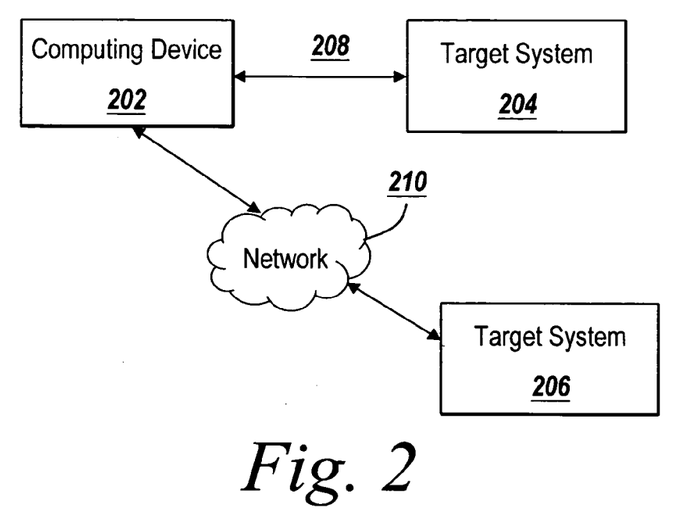
FIG. 2 is a block diagram illustrating how a computing device can communicate with a target system.

FIG. 2 illustrates an implementation that allows computing device 202 to communicate with a target system 204 or 206. Computing device 202 may be a computing device similar to computing device 102. Computing device 202 may communicate with target system 204 directly via link 208. Computing device 202 may also communicate with target system 206 via network 210. Network 210 may be a LAN, WAN, wireless network, or a combination of a wired and a wireless network.

Computing device 202 may obtain information about target system 204 or 206 so that stack usage calculator 124 can determine stack usage related to target system 204 or 206, such as stack usages for a model 128 employed on target system 204 or 206. Computing device 202 may provide the obtained information to code generator 122. Code generator 122 may use the obtained information to identify a type of generated code to ensure that generated code can be executed on the target system 204 or 206.

Figure 3:
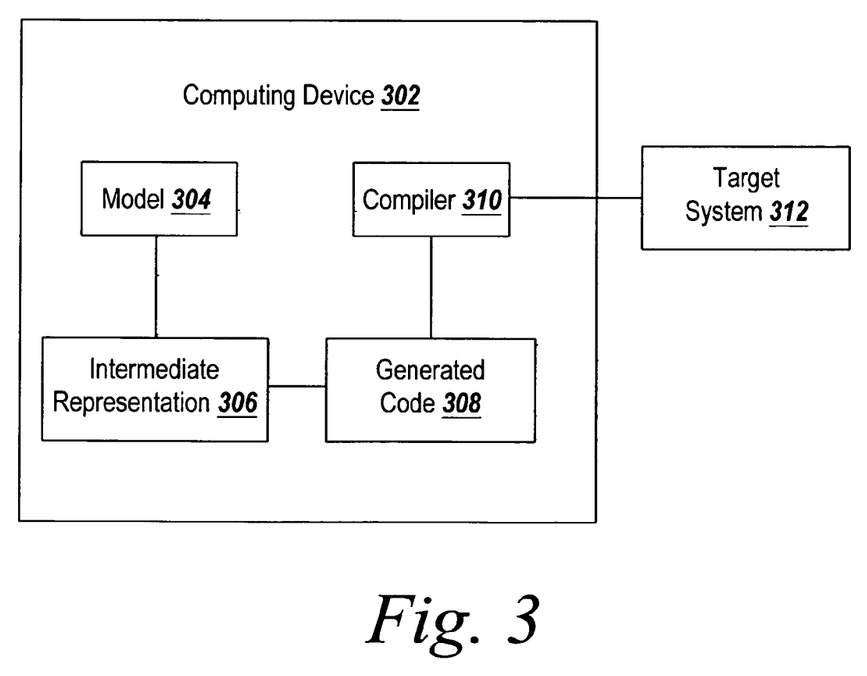
FIG. 3 is a block diagram illustrating an exemplary configuration for transforming a graphical model into code that can be ported to a target system.

FIG. 3 is a block diagram illustrating a computing device 302 that transforms a model 304 into code that can be ported to a target system 312. Computing device 302 may be a computing device that has components such as shown in computing device 102. The model 304 may first be transformed into an intermediate representation 306 that identifies how each line of code should be generated for each component. The intermediate representation 306 is then transformed into generated code 308 automatically or manually. The generated code 308 is compiled by compiler 310 before the compiled code is ported to target system 132.

By way of example, code generation can be discussed in terms of generating code with Real-Time Workshop® software from a graphical model generated using Simulink® modeling environment. Real-Time Workshop® software uses an intermediate representation 306 of the graphical model 304 and/or target language compiler script files, with a .tlc file extension, as input files to the compilation and code generation process. The intermediate representation 306 identifies how each block is translated into automatically generated code 308. The .tlc files provide sections of programming instructions that are implemented for block types that may be found in graphical model 304 during the compilation and code generation process and allow customization of the generated code by the user. For example, in the SIMULINK modeling environment, a block type may be Sum, Product, Constant, Gain, or Lookup Table. One or more instances of a block type may occur in a model, for each of these different block types, there is one .tlc file associated with the block type. The user defined S-function block may have a .tlc file associated with it. In this case, the .tlc file is unique to the S-function name used in the S-function block. The .tlc files may provide data and class definitions for data objects found in the graphical model 304.

Additionally, the .tlc files also include compiler directives, built-in functions and other code generation commands to direct Real-Time Workshop® during the code generation process. Simulink® software may create and may store graphical models 304 into model files using a .mdl file extension. During compilation and as part of the code generation process, Real-Time Workshop® reads in a .mdl model file and analyzes the graphical model 304 to generate an intermediate representation 306 of the model 304. This intermediate representation 306 identifies how each line of automatically generated code 308 should be generated for each graphical modeling component.

A language compiler called the target language compiler of Real-Time Workshop® works with .tlc files and the intermediate representation(s) 306 to automatically produce generated code 308. For example, the target language compiler uses block .tlc files, which specify the particular code for a block, to transform the block into code.

The source code files generated from the automatic code generator 122 may include program instructions compatible with a programming language, such as C. Alternatively, the source code files may be in a programming language other than C that may be compatible with a target system 312. The program instructions of the source code files may be generated to run on any operating system 116, such as a real-time operating system, or an operating system adapted for a specific processor.

The generated code 308 or the intermediate representation 306 can be used to analyze stack usage of the corresponding graphical model 304. A stack in a target system 312 may be used to store temporary variables, pass parameters to call functions, save a state of a thread, etc. If stack usage exceeds an allocated amount on the target system 312, then the behavior of automatically generated code 308 on the target system 312 may become nondeterministic. For example, data stored on the stack may be overwritten by new data due to the lack of stack storage space or part of the program code may be overwritten due to stack overflow. Such behavior may lead to a catastrophic failure of the target system 312 since the program code may not operate on the correct data or may be damaged when part of the program code is overwritten by data that is supposed to be stored in the stack. Therefore, it is often desirable for a user/designer to know whether enough stack is allocated for the generated code.

For a target system 312, modeling/programming environment 120 can obtain information about memory amounts or how much stack usage amounts are needed to store a type of data. For example, if a double precision number requires 8 bytes of memory in a target system 312 and if each memory address in a stack has only 4 bytes, then a double precision number will take up two entries in the stack while a single precision number that requires only 4 bytes of memory will only take up a single entry to store in the stack.

A call tree may be obtained for each component, block, subsystem, or model from its corresponding intermediate representation 306 or the generated code 308. To find a maximum stack usage of a component, a block, subsystem, or model, the call tree may be analyzed to see which path through the call tree requires the largest amount of stack usage. Stack usage for every function and variable in the call tree may be analyzed. The call tree is then analyzed to see which invocation path from the call tree's root to a leaf uses the largest amount of stack memory. If multiple threads may be used, then a worst case stack usage for each thread's call tree may need to be examined. The maximum stack usage is then the sum of the worst case stack usage of each independent thread's call tree.

Likewise, minimum stack usage can be identified by analysis of the call tree. In this case, if multiple threads may be used, a best case stack usage for each thread's call tree may need to be examined. Additional stack usage characteristics can be identified. For example, mean stack usage can be determined based on an analysis of the call tree, potentially with a distribution of likelihood of various amounts of stack usage.

Depending on the target system, registers, instead of stacks, may be used to store certain variables and/or return addresses of functions. In this case, those certain variables and/or return addresses of functions do not need to be taken into consideration when estimating stack usage. Hence, if a call tree includes variables that are stored in registers, the memory usage of these variables is not used to estimate stack usage.

Summing up all the worst-case scenarios for each function call in the call tree can provide an estimate of the worst case stack usage. Stack usage of synchronous tasks or periodically scheduled functions can be determined based on the periodic rates. Stack usage also needs to be determined for any asynchronous tasks. By using an average or maximum trigger rate for each asynchronous task, stack usage calculator 124 can analyze the frequency of asynchronous tasks together with the synchronous tasks or periodically scheduled functions to provide estimates of worst case stack usage.

The worst case stack usage for each component, block, subsystem, and model may be displayed in the model. The displayed worst case stack usage in the model can allow a user to see stack usage at different parts of the model. If it is shown that the stack on the target system does not have enough stack space for the analyzed worst case scenario, a user may choose to modify the model, employ optimizations with respect to the model, employ a different target system, etc.

Figures 4A, 4B:
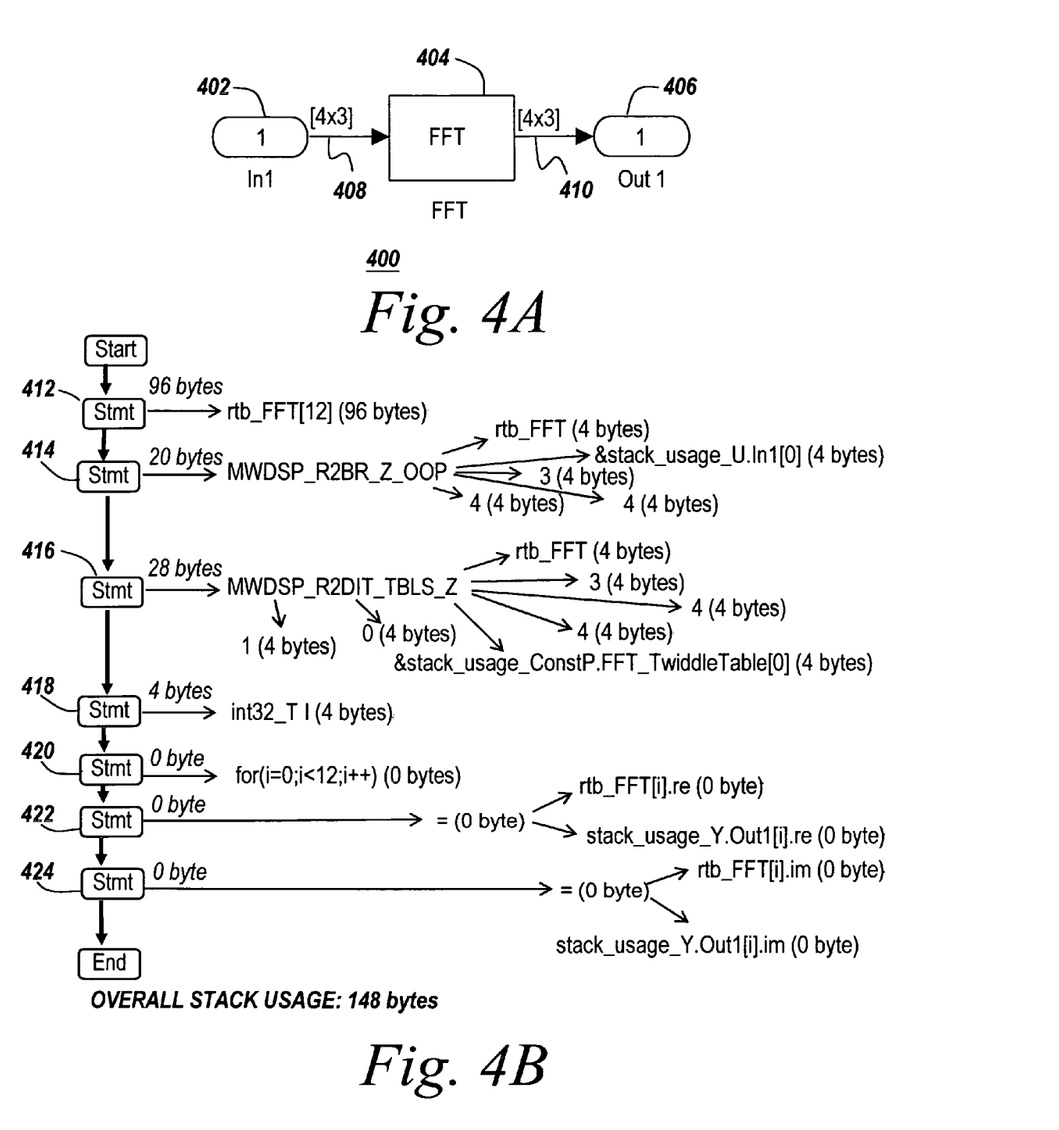
FIG. 4A illustrates an exemplary graphical model.
FIG. 4B illustrates an exemplary technique for determining stack usage for a graphical modeling component in FIG. 4A.

FIG. 4A illustrates an exemplary model and FIG. 4B illustrates an exemplary function call tree generated from an intermediate representation of a graphical modeling component in the exemplary model. FIG. 4A illustrates an exemplary model 400 that includes an input block 402 and an output block 406. The input block 402 provides a signal 408 to FFT block 404. In the implementation of FIG. 4A, the signal 408 is represented using a 4 by 3 two-dimensional array. In other implementations, signal 408 may be represented by other types of scalars and/or arrays, such as arrays having a different size or more than two dimensions. The FFT block 404 outputs a signal 410 that may have the same dimension as signal 408 and/or a different dimension. The analysis of worst case stack usage can be shown for multiple target systems, such as shown in FIG. 4B, so that a user may have the different worst case stack usage data side by side to study the tradeoff among the target systems or to determine which target system is the most suited to employ the graphical model.

FIG. 4B illustrates an exemplary function call tree that can be used with exemplary embodiments. FIG. 4B illustrates a technique for determining stack usage for FFT block 404 using an intermediate representation of FFT block 404. In FIG. 4B, statements 412, 414, 416, 418, 420, 422, and 424 each represent an intermediate representation for a line of code that will be generated automatically for use on target system 312. Analysis of stack usage in block FFT 404 starts at the first line of code that is generated from statement 412 and ends at the last line of code that is generated from statement 424. In statement 412, a local variable rtb_FFT in the form of an array is used. The local variable rtb_FFT includes 12 entries in the array. If the target system uses 8 bytes for each entry in the array, it can be calculated that code generated from statement 412 uses 96 bytes (i.e., 8 times 12) in the target system.

In statement 414, a function call is made to MWDSP_R2BR_Z_OOP that takes in five arguments, i.e. a pointer to rtb_FFT, a pointer to &stack_usage_U.In1[0], a constant with value 3, and two constants with value 4. If each constant and pointer occupies 4 bytes in the stack of the target system 312, code generated from statement 414 uses 20 bytes of stack in target system 312.

In statement 416, a function call is made to MWSDSP_R2DIT_TBLS_Z that takes in seven arguments that may include pointers and constants. Code generated from statement 416 uses 28 bytes of stack in target system 312 assuming each constant and point occupies 4 bytes on target system 312. In statement 418, a local variable int32_T i is used and no function call is made. Code generated from statement 418 takes 4 bytes of stack in the target system. Statement 420 includes a for loop statement that does not use stack in the target system.

Statements 422 and 424 represent assignments of values. Assignment operations generally do not incur stack usage and for this example, it is assumed that no stack is used for assignment operations. To calculate the maximum stack usage for block FFT 404, the maximum stack usage from each statement is summed to yield a total usage that is the maximum stack usage for code that is generated from block FFT 404. In this example, the maximum stack usage is 148 bytes for block FFT 404.

In one embodiment, stack usage calculator 124 may calculate a best-case stack usage for a component or a model. To find the best-case stack usage, a function call tree may be analyzed to see which path through the call tree requires the least amount of stack usage. In another embodiment, stack usage calculator 124 may calculate an average stack usage for a component or a model. In one implementation, the average stack usage may be the average of the best-case stack usage and the worse-case stack usage.

Figure 5A:
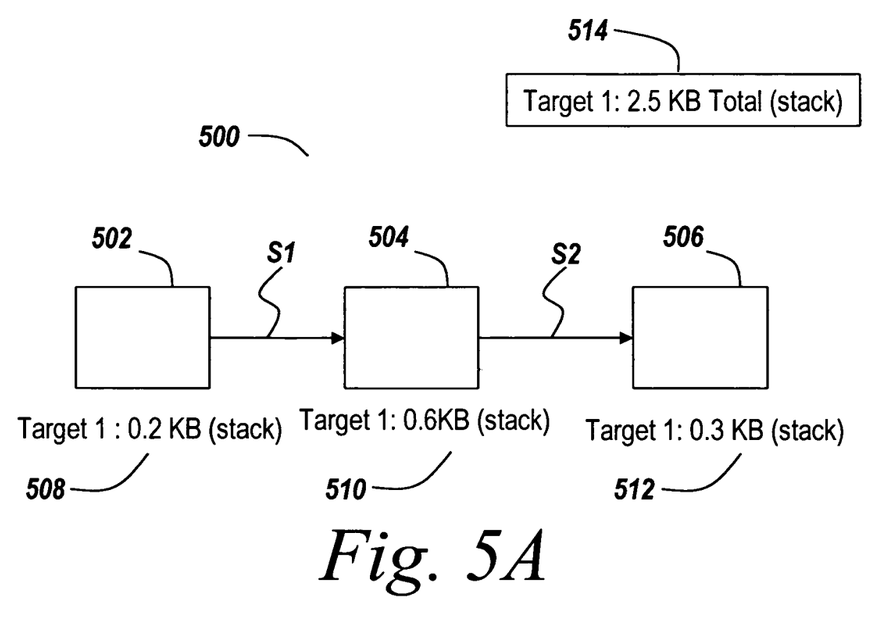
FIG. 5A illustrates an exemplary graphical annotation of stack usage that uses information from a target system.

FIG. 5A illustrates an exemplary graphical annotation of stack usage for a model given information on a target system 132. Model 500 has block 502 that feeds a signal S1 to block 504 that further feeds a signal S2 to block 506. After an analysis of stack usage is performed, graphical user interface widgets 508, 510, and 512 can be used to display maximum stack usage on the model 500 for blocks 502, 504, and 506, respectively. Graphical user interface widgets 508, 510, and 512 may be positioned close to, or possibly overlapping, the corresponding block so that block identification information may not have to be included in the widgets. Widget 514 is used to display the maximum stack usage of the model 500 once stack usage calculator 124 finishes analyzing stack usage of the entire model.

In one embodiment, graphical affordances, such as a heat index coloring spectrum (e.g., red indicates large stack usage while blue indicates little stack usage), indicator bar, may be used to display an amount of stack usage. In another embodiment, a percentage of stack usage with respect to the total available stack space may be displayed.

Figure 5B:
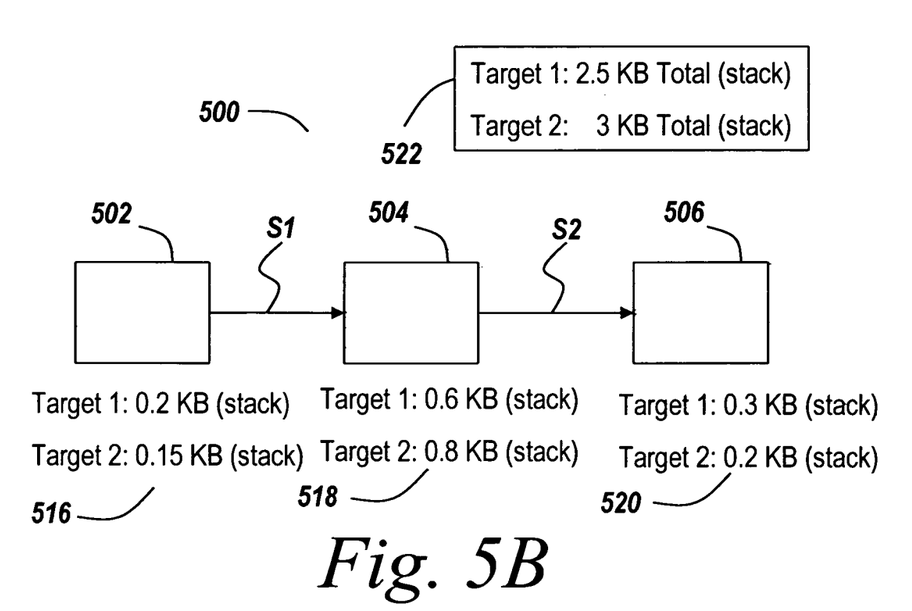
FIG. 5B illustrates an exemplary graphical comparison of stack usage for two target systems.

FIG. 5B illustrates an exemplary graphical comparison of stack usage of a graphical model using information from two target systems. Modeling/programming environment 120 can store stack usage analysis for one target system and stack usage calculator 124 can analyze the stack usage for another target system. Modeling/programming environment 120 can be configured to display stack usage of multiple target systems side by side. In model 500, widgets 516, 518, 520, and 522 display maximum stack usage for two target systems side by side. Hence, a user may be provided with a side by side comparison of stack usage for multiple systems.

In one embodiment, graphical configuration settings that control stack usage, such as the overall maximum stack size and the size of any one local (stack) variable, can be used together with estimation of maximum stack usage of a target system. These configuration settings may be specified on the graphical model and can be applied as constraints when code is generated from the graphical model. If the estimated stack usage of the automatically, generated code is greater than the specified allocated stack size, then a warning may be issued by the modeling/programming environment 120 in a suitable graphical manner.

Figure 5C:
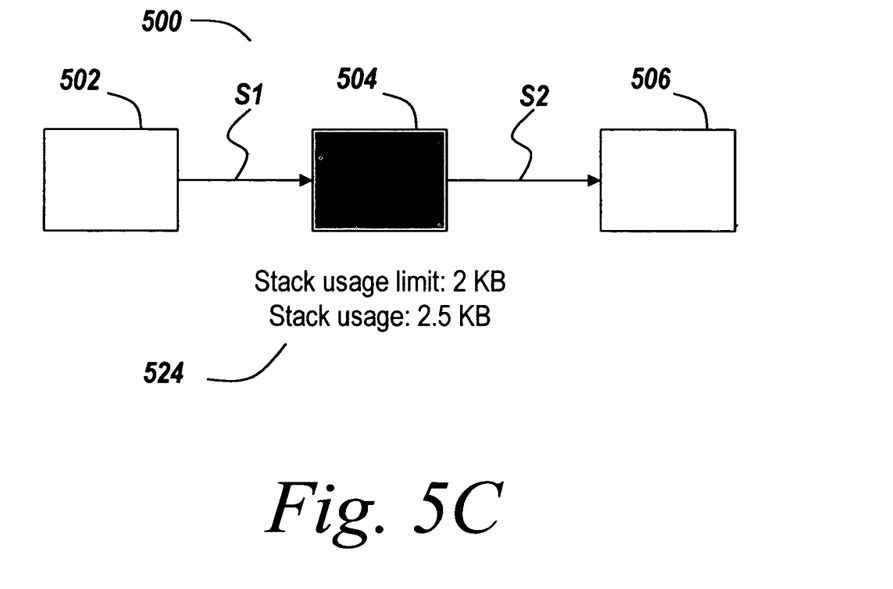
FIG. 5C illustrates an exemplary graphical annotation that identifies a graphical modeling component that exceeds a stack usage limit.

FIG. 5C illustrates an example where the estimated stack usage of the generated code is greater than the specified stack usage limit. An exemplary graphical annotation for identifying problematic graphical modeling component(s) can be provided on the graphical model. As shown in graphical user interface widget 524, the stack usage limit is set to 2 KB for block 504 but when code is generated for a specified target system, then stack usage calculator 124 determines that the maximum stack usage is 2.5 KB for block 504 according to information provided about the specified target system.

Block 504 may be highlighted so that it is easy for a user to identify problematic graphical modeling component(s) or model(s). Alternatively, names of graphical modeling components or models that exceed a stack usage budget, i.e., the stack usage limit, can be listed in a window. The listed graphical model components and/or graphical models may include links to facilitate display of information to a user (e.g., a link may direct a user to a destination that includes a problematic graphical modeling component).

FIG. 5C illustrates an implementation that includes a single problematic graphical modeling component. Other implementations may include two or more problematic graphical modeling components. One of ordinary skill in the art will also appreciate that exemplary embodiments and/or techniques are not limited to a specific graphical annotation of stack usage and/or specific graphical annotation of warning or error to identify problematic graphical modeling component(s) and/or model(s). For example, in one embodiment, a graphical modeling component that does not exceed a stack usage limit may also have a corresponding graphical user interface widget that displays the stack usage limit and the estimated maximum stack usage. In another example, when the estimated stack usage of the graphical modeling component is lower than a stack usage limit, the graphical modeling component may be identified in the model via textual or graphical annotations.

Figure 5D:
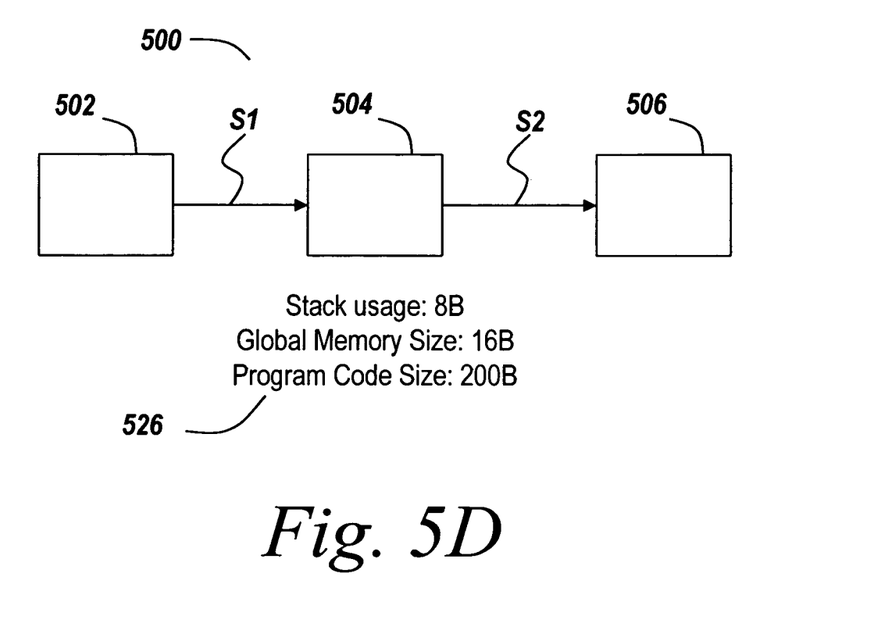
FIG. 5D illustrates an exemplary graphical annotation of target metrics based on information from a target system.

Target metrics other than stack usage, such as program code size, data memory size, global memory size, execution performance, etc. may also be displayed in the graphical model. For example, FIG. 5D illustrates an exemplary graphical annotation of target metrics on a graphical model. Modeling/programming environment 120 can use techniques similar to those used to determine stack usage in order to determine program code size, data memory size, etc. In one embodiment, program code size may be determined by generating code and/or compiling the generated code associated with the corresponding graphical modeling component for deployment on the target system. In another embodiment, a simulator simulating a behavior of the target system may be used to simulate an execution of a representation of a graphical modeling component or a graphical model. Data, such as execution time and memory usage, may be obtained from the simulator and displayed on the graphical model. Mean execution time and mean memory usage with deviation may be obtained by simulating the behavior of the target system multiple times, possibly with different input data.

In another embodiment, a representation of a graphical modeling component or graphical model may be executed on the actual target system and execution metrics and memory usage may, be obtained. Mean execution metrics and mean memory usage with deviation may be obtained by executing the representation of the graphical modeling component or graphical model with different input data. Once these target metrics are determined, they can be displayed on the graphical model.

FIG. 5D shows that block 504 has a stack usage of 8 B, a global memory size of 16 B, and a program code size of 200 B. These target metrics are shown in a graphical user interface widget 526 that is positioned close to block 504. Although FIG. 5D illustrates that only target metrics for block 504 are displayed, one of ordinary skill in the art will recognize that target metrics for other blocks or the entire model can also be displayed in the model 500.

Figure 5E:
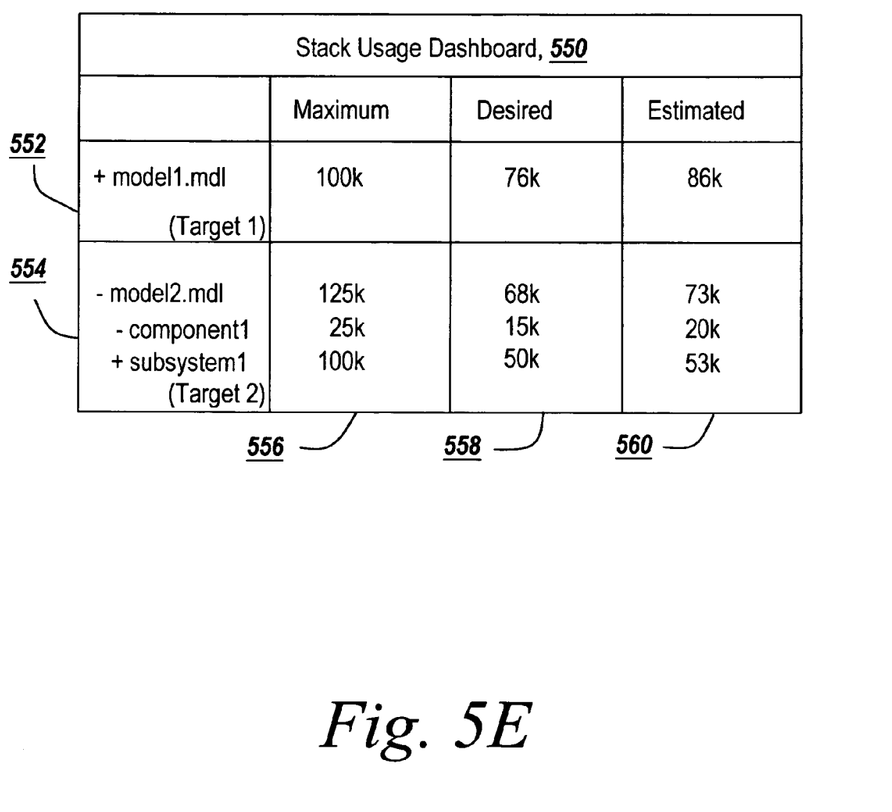
FIG. 5E illustrates an exemplary memory dashboard interface that allows a user to see various stack usage information of different models on different target systems.

FIG. 5E illustrates an exemplary memory dashboard interface that allows a user to see various stack usage information of one or more components and/or models on one or more target systems. FIG. 5E shows stack usage dashboard 550 that shows stack usage information for two different models. Row 552 shows the overall stack usage based on a first model ("model1.mdl") for executing on target 1. Row 554 shows the overall stack usage and certain component stack usage on a second model ("model2.mdl") for executing on target 2.

In FIG. 5E, columns 556, 558, and 560 shows maximum stack usage, desired stack usage, and estimated stack usage, respectively. The maximum stack usage may be the total amount of stack space available on a target system. The maximum stack usage may also be a user-specified amount of stack space on the target system. The desired stack usage may be a user-preferred amount of stack usage. The estimated stack usage may be the maximum stack usage estimated by the stack usage calculator 124.

With respect to the first model ("model1.mdl"), stack usage dashboard 550 shows that the maximum stack usage is 100 k, the desired stack usage is 76 k, and the estimated stack usage is 86 k for executing a representation of the first model on target 1. The first model ("model1.mdl") has a "+" sign in front of the model name and if the "+" sign is selected, components of the first model may be displayed with their respective stack usage information. Once the "+" sign is selected, the sign is changed to "−" sign to show that the first model has been expanded to show components of the first model.

With respect to the second model ("model2.mdl"), stack usage dashboard 550 shows that the maximum stack usage is 125 k, the desired stack usage is 68 k, and the estimated stack usage is 73 k. The second model is in an expanded mode (i.e. "−" sign is showing in front of the model) that shows that the second model includes a first component ("component1")

and a second component ("subsystem1"). The second component may be further expanded by selecting the "+" sign in front of the component name.

For the first component, stack usage dashboard 550 shows that the maximum stack usage is 25 k, the desired stack usage is 15 k, and the estimated stack usage is 20 k. For the second component, stack usage dashboard 550 shows that the maximum stack usage is 100 k, the desired stack usage is 50 k, and the estimated stack usage is 53 k.

One of ordinary skill in the art will appreciate that the invention is not limited to the exemplary stack usage dashboard 550 and other user interface may be used to display the maximum stack usage, the desired stack usage, and/or the estimated stack usage. Additionally, a stack usage dashboard may also display stack usage information for more than one model for use on the same target system. A stack usage dashboard may be used to display average stack usage, minimum stack usage, and other stack usage characteristics. Furthermore, a stack usage dashboard may also display stack usage information of the same model on different target system so that a user may have a visual comparison of stack usage information.

Figure 6:
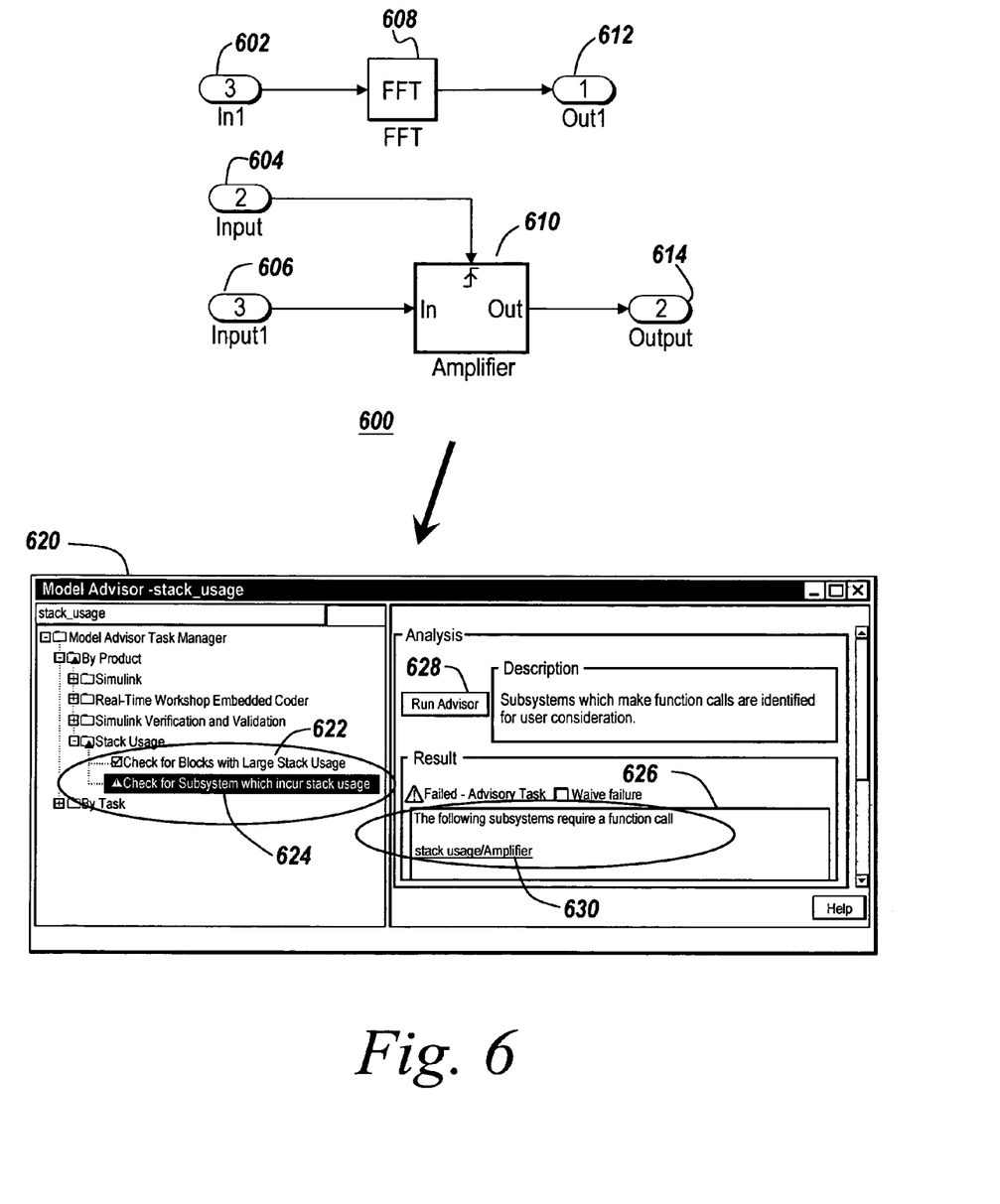
FIG. 6 illustrates an exemplary user interface that may be used to provide stack usage information.

FIG. 6 illustrates an exemplary user interface that may be used to provide diagnostic information regarding stack usage. Model 600 may include block 608 ("FFT") and block 610 ("Amplifier"). Block 608 may receive input 602 and may generate output 612 (e.g. output 612 may be generated in response to input 602). Block 610 my include input 604, input 606, and output 614.

A user interface 620 can be used to allow a user to choose what type of stack usage the user wishes to track. For example, the implementation of FIG. 6 may provide the user with two options: (1) one option 622 to check for blocks with large stack usage and (2) option 624 to check for one or more subsystems that incur stack usage. Although only two options are illustrated in FIG. 6, additional options can be provided via user interface 620. For example, an option can be provided to check for blocks that exceed a certain stack usage.

After one or more options are chosen, the user can click on run advisor button 628 to run analysis on model 600. Results of the analysis may be displayed in text box 626. In this example, text box 626 shows that there is a subsystem called "Amplifier" that requires a function call. Based on the diagnostic information provided in text box 626, a user can choose to modify model 600, code generation option(s), etc., to reduce the amount of stack that is used on the intended target system. Alternatively, a user can also choose to use a different target system so that there is enough stack space for use by the generated code from the model.

In one embodiment, changes, such as model configurations, optimization algorithms, etc., may be automatically applied to model 600 to minimize stack usage. For example, when stack usage analysis shows that estimated stack usage exceeds what is available or desired, optimizations may be automatically applied to the model to achieve a certain goal, such as usage of 95% of available stack space.

In one embodiment, a hyperlink 630 may be provided with "Amplifier" subsystem that is identified in the text box 626 so that a user may select the hyperlink 630 with a pointing device to access "Amplifier" subsystem 610 in the model 600.

Figure 7:
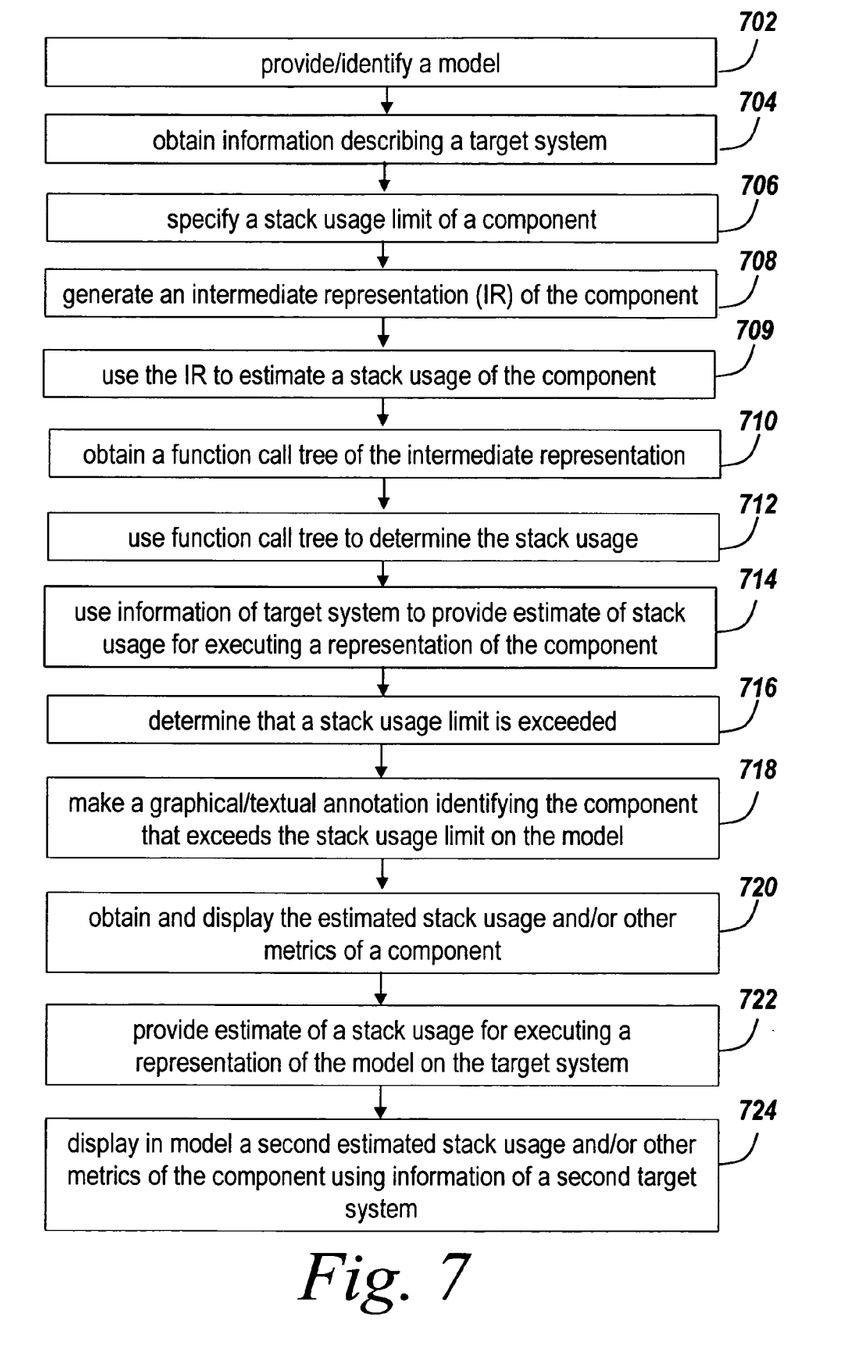
FIG. 7 is a flowchart depicting processing that can be used to practice one or more exemplary embodiments.

FIG. 7 illustrates a flowchart depicting processing that may be performed to practice an exemplary embodiment. In step 702, a model is provided or identified. The model may be a text based model implemented in a text based programming/modeling environment. Alternatively, the model may be a graphical model implemented in a graphical modeling environment. The graphical model may be an executable model, such as an executable time-based block diagram model created in the SIMULINK modeling environment.

In step 704, information describing a target system is obtained. The target system information may be obtained from the target system, a user, or another device (i.e. a third party device other than the target system). For example, a database may provide information about stack usage on a target device. The information may include information on how much memory is used for each data type. The information may also include information about stack usage on the target system. The information may further include information about registers that can store certain addresses or data. The information is used to determine how the target system uses stack memory so that stack usage calculator 124 can estimate how much stack memory will be used when a representation of the model or component is executed on the target system.

In step 706, a user may specify a stack usage limit for a component or model using a code generation property. For example, Real-Time Workshop® Embedded Coder of The MathWorks, Inc. of Natick, Mass. provides a feature/user interface where a user can control and/or specify stack space allocation for a component, such as a block in a graphical model or a section of a code in a text based model. In one embodiment, an input may be received to modify the stack usage limit or the component. The input may be configured to prevent the stack usage limit from being exceeded.

In step 708, modeling/programming environment 120 may optionally generate an intermediate representation of the component. In step 709, the intermediate representation may be used to estimate the stack usage of the component for executing the representation of the component on the target system. The intermediate representation may be used to estimate the maximum stack usage, the minimum stack usage, average stack usage, mean stack usage with deviation, etc.

In one embodiment, when the component is a piece of code in a text based model, such as a model built in MATLAB programming environment, an intermediate representation may be created for the component where the intermediate representation lays out how code should be generated for execution on the target system. For example, when a line of code in the MATLAB programming language involves a matrix calculation, an intermediate representation may be first generated to determine how C code should be generated and more than one line of C code may be generated for execution on the target system for the one line of code in the MATLAB programming language.

In step 710, a function call tree of the intermediate representation may be optionally obtained by the stack usage calculator 124 to calculate stack usage of a model or a component, such as a block or subsystem. In step 712, the stack usage of the component may be optionally determined by the stack usage calculator 124 by finding a most expensive path in the function call tree, where the most expensive path requires the most stack usage among all the paths in the function call tree. To find the most expensive path in the function call tree, the call tree may be analyzed to determine which invocation path through the call tree requires the largest amount of stack usage. If applicable, asynchronous tasks and synchronous/periodic tasks are also analyzed together with the call tree to find the worst case scenario, the best case scenario, the average case scenario, etc., for stack usage in the target system.

In step 714, the information is used by stack usage calculator 124 to provide an estimate of a stack usage for executing a representation of a component on the target system. The representation of the component may be an intermediate representation or automatically generated code from the component. In one embodiment, the estimate of stack usage occurs without generating code from the component for executing on the first target system. In one embodiment, the estimate of the stack usage is determined during compilation of the model in the modeling/programming environment. In another embodiment, the estimate of the stack usage is determined using a stack simulator.

In step 716, stack usage calculator 124 determines the stack usage for the component, for a portion of the model that includes multiple components, or for the entire model. The stack usage calculator 124 may further compare the stack usage with a stack usage limit. When the stack usage exceeds the stack usage limit, a graphical annotation, such as shown in FIG. 5C, can be made on the model in step 718 identifying the component or model that exceeds the stack usage limit. In another embodiment, when stack usage is determined to be lower than the stack usage limit, the corresponding component may be identified in the model, such as by a graphical annotation or a textual annotation.

In step 720, the estimated stack usage and/or other target metrics of the component can be optionally displayed in the model. Hence, stack usage can be graphically annotated in the model in the modeling/programming environment. In step 722, an estimate of stack usage of the model for executing a representation of the model may be provided. In one embodiment, an estimate of a stack usage is determined for each component in the model. In another embodiment, an estimate of a stack usage is determined for a portion of the model that includes multiple components. In one embodiment, a report may be generated to include stack usage information of the model or one or more components of the model. A report may also be generated to include other target metrics, such as program code size, execution performance, etc.

In step 724, a second estimated stack usage may be calculated and displayed. The second stack usage may be determined using information describing a second target system and may be optionally displayed in the model with a previously estimated stack usage. When displayed, a user can see in the model the stack usage of two different target systems, for example, side by side, such as shown in FIG. 4B. Other target metrics, such as program code size, execution performance, may also be displayed in the model. As such, a comparison stack usages on different target systems can be performed to show analysis of stack usage for multiple target systems to be shown on the same model. In one embodiment, a report may be generated to include comparison of stack usage information between different target systems. A report may be generated to include a comparison of other target metrics, such as program code size, execution performance, etc.

Exemplary implementations may allow for the determination of stack usage for a target device.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIG. 7, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1-3 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Further, the phrase "based on," as used herein is intended to mean "base, at least in part, on" unless explicitly stated otherwise.

The scope of the invention is defined by the claims and their equivalents.

We claim:

1. A method implemented in an electronic device, the method comprising:
   obtaining information describing a first target system;
   using the information to estimate s maximum stack usage, the maximum stack usage:
      representing a usage of a stack of the first target system at a given time, related to executing a model on the first target system, determined without executing the model,
   and
      estimated by;
         representing function calls of the model as a function call tree, the function call tree having a plurality of invocation paths representing call chains in the model, and
         identifying a most expensive one of the plurality of invocation paths in the function call tree, wherein the most expensive one of the plurality of invocation paths is associated with a most-expensive-path stack usage for others of the plurality of paths; and
   setting the maximum stack usage to the most-expensive stack usage.

2. The method of claim 1, wherein the model is implemented in a text-based programming environment or text-based modeling environment.

3. The method of claim 1, wherein the model is a graphical model.

4. The method of claim 1, wherein the using the information to estimate the maximum stack usage is performed during compilation of the model.

5. The method of claim 3, wherein the graphical model is implemented in a SIMULINK-compatible environment.

6. The method of claim 1, further comprising:
   generating an intermediate representation of the model; and
   using the intermediate representation to estimate the maximum stack usage.

7. The method of claim 1, wherein the information describing the first target system includes information about an amount of memory used for a data type on the first target system.

8. The method of claim 1, wherein the information describing the first target system includes information about stack usage on the first target system.

9. The method of claim 1, further comprising:
   displaying the estimated maximum stack usage.

10. The method of claim 9, further comprising:
displaying, in the model, a second estimated maximum stack usage associated with the model using information related to a second target system.

11. The method of claim 1, further comprising:
specifying a stack usage limit for the model;
determining whether the maximum stack usage exceeds the stack usage limit; and
making a graphical annotation on the model when the maximum stack usage exceeds the stack usage limit, the graphical annotation indicating that the stack usage limit is exceeded.

12. The method of claim 11, further comprising:
providing a user interface for a user to indicate the stack usage limit.

13. The method of claim 11, further comprising:
receiving an input to modify the stack usage limit or the model.

14. The method of claim 13, wherein the input is configured to prevent the stack usage limit from being exceeded.

15. The method of claim 1, wherein the information describing the first target system is obtained from the first target system or a user.

16. The method of claim 1, further comprising:
providing a user interface displaying information about a stack usage limit for the first target system, a desired stack usage for the first target system, and an estimated stack usage on the first target system for the model when the model is converted into code for use on the first target system.

17. The method of claim 1, further comprising:
generating a report including an execution stack usage related to executing the model on the first target system.

18. A system comprising:
a memory for storing a plurality of components of a model, the model operating in a modeling or programming environment, the modeling or programming environment obtaining information describing a first target system; and
a processor configured to:
provide a stack usage calculator to estimate a maximum stack usage for executing a representation of the plurality of components on the first target system, the maximum stack usage:
representing a usage of a stack of the first target system at a given time,
determined without executing the representation of the plurality of components, and
estimated by:
representing function calls of the model as a function call tree, the function call tree having a plurality of invocation paths representing function call chains in the model, and
identifying a most expensive one of the plurality of invocation paths in the function call tree, wherein the most expensive one of the plurality of invocation paths is associated with a most-expensive-path stack usage, the most expensive stack usage exceeding a stack usage for others of the plurality of paths; and
set the maximums stack usage to most-expensive-path usage.

19. The system of claim 18, further comprising:
a compiler, the compiler configured to:
compile the model, and
generate an intermediate representation of the model, the intermediate representation being used to provide the estimate of the maximum stack usage.

20. The system of claim 18, wherein the maximum stack usage of the representation of the plurality of components is displayed in the model.

21. The system of claim 18, wherein the information describing the first target system includes information about stack usage on the first target system.

22. The system of claim 18, further comprising:
a code generator to automatically generate code based on the model.

23. The system of claim 18, further comprising:
a report generator generating a report including the estimate of the maximum stack usage.

24. The system of claim 18, further comprising:
a user interface displaying information about a stack usage limit for the first target system, a desired stack usage for the first target system, and an estimated stack usage on the first target system for the component when the component is converted into code for use on the first target system.

25. The system of claim 24, wherein the user interface allows a user to specify the stack usage limit or the desired stack usage.

26. A non-transitory medium storing executable instructions executable by a computing device:
obtain information describing a first target system;
use the information to estimate a maximum stack usage, the maximum stack usage:
representing a usage of a stack of the first target system at a given time,
related to executing a model on the first target system,
determined without executing the model, and
estimated by:
representing function calls of the model as a function call tree, the function call tree having a plurality of invocation paths representing function call chains in the model, and
identifying a most expensive one of the plurality of invocation paths in the function call tree, wherein the most expensive one of the plurality of invocation paths is associated with a most-expensive-path stack usage that exceeds a stack usage for others of the plurality of paths;
setting the maximum stack usage to the most-expensive-path stack usage; and
storing the maximum stack usage in a storage.

27. The medium of claim 26, further storing:
instructions for generating an intermediate representation of the model; and
instructions for using the intermediate representation to estimate the maximum stack usage.

28. The medium of claim 26, wherein the information describing the first target system includes information about stack usage on the first target system.

29. The medium of claim 26, wherein the using the information to estimate the maximum stack usage is performed during compilation of the model.

30. The medium of claim 26, further storing:
instructions for displaying the estimate of the maximum stack usage.

31. The medium of claim 30, further comprising:
instructions for displaying, in the model, a second estimated maximum stack usage associated with the model, the second estimated maximum stack usage determined using information related to a second target system.

32. The medium of claim 26, further comprising:
instructions for specifying a stack usage limit for the model;
instructions for determining whether the maximum stack usage exceeds the stack usage limit; and
instructions for making a graphical annotation on the model when the maximum stack usage exceeds the stack usage limit, the graphical annotation indicating that the stack usage is exceeded.

* * * * *

UNITED STATES PATENT AND TRADEMARK OFFICE
CERTIFICATE OF CORRECTION

| | |
|---|---|
| PATENT NO. | : 8,578,347 B1 |
| APPLICATION NO. | : 11/646848 |
| DATED | : November 5, 2013 |
| INVENTOR(S) | : James Carrick et al. |

It is certified that error appears in the above-identified patent and that said Letters Patent is hereby corrected as shown below:

In the Claims:

Column 14, line 25 (Claim 1, line 4), after "estimate" change the word "s" to --a--.

Column 15, line 63 (Claim 18, line 28), change "maximums" to --maximum--.

Column 15, line 63 (Claim 18, line 28), after "to" insert --the--.

Column 15, line 64 (Claim 18, line 29), before "usage" insert --stack--.

Column 16, line 27 (Claim 26, line 2), after "device" insert --to--.

Signed and Sealed this
Eighteenth Day of March, 2014

Michelle K. Lee
*Deputy Director of the United States Patent and Trademark Office*